(12) United States Patent
Bouwmeester et al.

(10) Patent No.: US 11,376,802 B2
(45) Date of Patent: Jul. 5, 2022

(54) METHOD FOR PREPARING A COMPOSITE PRODUCT

(71) Applicant: Fiberneering Technology Development B.V., Zwolle (NL)

(72) Inventors: Jasper Gerrit Hendrik Bouwmeester, Zwolle (NL); Florin Adrian Stuparu, Zwolle (NL); Willem Johan Hoeben, Zwolle (NL)

(73) Assignee: Fiberneering Technology Development B.V., Zwolle (NL)

( * ) Notice: Subject to any disclaimer, the term of this patent is extended or adjusted under 35 U.S.C. 154(b) by 215 days.

(21) Appl. No.: 16/800,589

(22) Filed: Feb. 25, 2020

(65) Prior Publication Data

US 2020/0269528 A1 Aug. 27, 2020

(30) Foreign Application Priority Data

Feb. 26, 2019 (NL) ........................................ 2022640

(51) Int. Cl.
*B29C 70/40* (2006.01)
*B29C 64/20* (2017.01)
(Continued)

(52) U.S. Cl.
CPC ............ *B29C 70/40* (2013.01); *B29C 64/106* (2017.08); *B29C 64/20* (2017.08); *B33Y 10/00* (2014.12); *B33Y 30/00* (2014.12); *B33Y 80/00* (2014.12)

(58) Field of Classification Search
CPC ......... B29C 70/40; B29C 70/42; B29C 70/44; B29C 70/443; B29C 70/446; B29C 70/46;
(Continued)

(56) References Cited

U.S. PATENT DOCUMENTS

| 4,560,523 A | 12/1985 | Plumley et al. |
| 9,597,848 B1 | 3/2017 | Whipple et al. |
| 2006/0054039 A1* | 3/2006 | Kritchman ............. B33Y 10/00 427/256 |

FOREIGN PATENT DOCUMENTS

| EP | 2255957 A1 | 12/2010 |
| EP | 2952315 A1 | 12/2015 |

(Continued)

OTHER PUBLICATIONS

Search Report and Written Opinion for Dutch Application No. 2022640 dated Dec. 3, 2019, 10 pages.

*Primary Examiner* — Joseph S Del Sole
*Assistant Examiner* — Jamel M Nelson
(74) *Attorney, Agent, or Firm* — Bret E. Field; Bozicevic, Field & Francis LLP (57) ABSTRACT

A method is provided for preparing a composite product, the method comprising: forming a core structure having a plurality of layers, each layer being build by an additive manufacturing process; wherein the core structure has a shell substantially enclosing an internal chamber of the core structure, wherein the shell is fluid-impermeable, and wherein the outer surface of the shell has a predefined shape; introducing a fluid into the chamber of the core structure; arranging the core structure and reinforcement fibers in a mould, wherein the mould is arranged to accommodate the core structure including the reinforcement fibers, and wherein the reinforcement fibers and the outer surface of the shell are arranged in contact with each other; providing the reinforcement fibers and a resin on the outer surface of the shell of the core structure; and solidifying the resin to form the composite product inside the mould at a moulding pressure $P_m$, while controlling the fluid pressure $P_F$ of the fluid in the core structure.

21 Claims, 6 Drawing Sheets

(51) Int. Cl.
*B29C 64/106* (2017.01)
*B33Y 10/00* (2015.01)
*B33Y 30/00* (2015.01)
*B33Y 80/00* (2015.01)

(58) Field of Classification Search
CPC ... B29C 70/461; B29C 70/462; B29C 70/465; B29C 70/467; B29C 70/48; B29C 64/106; B33Y 10/00; B33Y 30/00; B33Y 80/00
See application file for complete search history.

(56) References Cited

FOREIGN PATENT DOCUMENTS

| | | | |
|---|---|---|---|
| GB | 2550339 A * | 11/2017 | ........... B29C 64/165 |
| WO | WO2018193269 A1 | 10/2018 | |

* cited by examiner

FIG. 7C

METHOD FOR PREPARING A COMPOSITE PRODUCT

FIELD OF INVENTION

The field of the invention relates to a method for preparing a composite product. The field of the invention further relates to a composite product obtainable from the method according to the present invention. The field of the invention further relates to a vehicle comprising a composite product according to the present invention.

BACKGROUND

A resin transfer moulding (RTM) method for preparing a composite product is generally known. In the RTM method dry reinforcement fibers are placed in a mould, which comprises two mould parts or more than two mould parts. A curable resin is injected into the mould using an injection pressure (typically 5-7 bars) to impregnate the dry reinforcement fibers and to form a composite product by curing the mixture of the curable resin and the reinforcement fibers.

The process may have many variations, like vacuum assisted RTM (VARTM), light RTM, wherein cheaper moulds and lower pressure are used, vacuum infusion, wherein no overpressure is used, and high pressure RTM, wherein pressures exceeding 20 bars are common.

In many cases it may be favorable to have the dry reinforcement fibers placed away from a center of the composite product. A bladder may be placed inside the mould, which bladder is pressurized during the moulding process, in order to withstand a relatively high moulding pressure, such as 5-7 bars or higher, during the moulding process. The resulting composite product is a hollow composite product. The bladder is taken out of the composite product after the moulding process.

A disadvantage of the known method is that the resulting hollow composite product may lack sufficient stiffness and/or strength for regular use of the composite product. Often, the hollow composite product needs to be filled with a structural foam core before or after the moulding process to enhance its stiffness and/or strength. This additional step further complicates the preparation of the composite product.

Another disadvantage of the known method is that, when using a bladder, the control on the layer thickness of the composite product is limited.

SUMMARY

Embodiments of the invention aim to provide a method for easily preparing a composite product. Particular embodiments aim to provide a method for improving a control on composite layers of the composite product.

Particular embodiments aim to provide a composite product, wherein the composite product has optimal strength at a lower weight of the composite product.

According to a first aspect of the invention there is provided a method for preparing a composite product, the method comprising:

forming a core structure having a plurality of layers, each layer being build by an additive manufacturing process; wherein the core structure has a shell substantially enclosing an internal chamber of the core structure, wherein the shell is fluid-impermeable, and wherein the outer surface of the shell has a predefined shape;

introducing a fluid into the chamber of the core structure;

arranging the core structure and reinforcement fibers in a mould, wherein the mould is arranged to accommodate the core structure including the reinforcement fibers, and wherein the reinforcement fibers and the outer surface of the shell are arranged in contact with each other;

providing the reinforcement fibers and a resin on the outer surface of the shell of the core structure; and solidifying the resin to form the composite product inside the mould at a moulding pressure $P_m$, while controlling the fluid pressure $P_F$ of the fluid in the core structure.

The core structure is formed using an additive manufacturing process and has a shell substantially enclosing an internal chamber of the core structure. A fluid is introduced into the internal chamber of the core structure, which is used during the moulding process for controlling the fluid pressure $P_F$ of the fluid in the core structure. The core structure is placed inside the mould and used during the moulding process for placing the reinforcement fibers away from a center of the composite product. The shape of the outer surface of the shell is predefined by the additive manufacturing process and is suitably selected to position the reinforcement fibers away from a center of the composite product. Additionally, the shape of the outer surface of the shell can be suitably defined by the additive manufacturing process to control the layer thickness of the fiber reinforced layer of the composite product.

The shell of the core structure, made in the additive manufacturing process, is impermeable to fluid in order to maintain the fluid inside the core structure during the moulding process. The shell and the chamber may be suitably defined by the additive manufacturing process to support a uniform fluid pressure $P_F$ of the fluid in the core structure during the moulding process.

The moulding pressure $P_m$ may be in the range of 1 bar-50 bar, preferably in the range of 5 bar-10 bar.

The fluid pressure $P_F$ of the fluid in the core structure may be controlled in various ways.

In an embodiment, during solidifying the resin the controlling of the fluid pressure $P_F$ is performed using an external fluid pressure device and wherein the fluid pressure device is arranged in fluid connection to the chamber.

In an embodiment, the shell of the core structure is made of a material having a young's modulus E of at least 0.5 GPa, more preferably a young's modulus E of at least 1.0 GPa, most preferably a young's modulus E of at least 1.5 GPa. The material of the shell having a young modulus of at least 1.0 GPa provides that a shape of the shell including a predefined shape of the outer surface is sufficiently stable. The young's modulus provides the shell may be provided having a sufficient bending stiffness. As a result, the shell is configured to retain said predefined shape of the outer surface of the shell constant. In this way, the predefined shape of the outer surface is supports an accurate positioning of the composite layers in the composite product and supports an accurate defining of the thickness of the composite layers during a moulding process.

In embodiments the young's modulus is in a range of 0.5 GPa-50 GPa, more preferably in a range of 1.0 GPa-20 GPa. It is for example 0.5 GPa or more, 1.0 GPa or more, 1.5 GPa or more or 2.0 GPa or more. It is for example 25 GPa or less, 20 GPa or less, 15 GPa or less or 10 GPa or less.

The young's modulus may be suitably selected to adjust a deformability of the shell in response to a pressure differential acting on the shell between the internal chamber at the inside of the shell and outside the shell.

In an embodiment, the core structure comprises a plurality of bridging elements arranged for bridging the internal chamber. The bridging elements are arranged inside the internal chamber to connect a part of the shell at one end of the bridging element to another part of the shell at another end of the bridging element.

In an embodiment, the bridging elements are configured to stiffen the shell in at least one direction. Preferably, the bridging elements increase a bending stiffness of the shell. The plurality of bridging elements may be are arranged to stiffen the shell in more than one direction. For example, a first set bridging elements may be are arranged inside the internal chamber extending in a first direction between an inner surface of the shell and a second set of bridging elements may be are arranged inside the internal chamber extending in a second direction between an inner surface of the shell, which second direction is different from the first direction. The first set of bridging elements is arranged to stiffen the shell in the first direction and the second set of bridging elements is arranged to stiffen the shell in the second direction.

In an embodiment, the bridging elements are selected from walls, pillars and weave elements.

In an embodiment, the core structure comprises a number of internal channels, such as tubes, arranged within the core shell for communicating an injection fluid, such as the resin, or a vacuum pressure to the outer surface of the shell.

In particular, the number of channels is integrally formed by the additive manufacturing process together with the core shell of the core structure. This enables a reliable manufacturing of the complex core structure.

The number of internal channels, such as tubes, may be one, may be two, and may be any number larger than two. In case the internal channel is at least partly composed of a tube, it has the advantage of relatively low weight. An internal channel may be arranged within the core shell for communicating an injection fluid, such as the resin, to the outer surface of the shell. This supports the Resin Transfer Moulding (RTM) process and may support a fast and uniform resin transfer to the moulding areas.

Additionally or alternatively, an internal channel may be arranged within the core shell for communicating a vacuum pressure to the outer surface of the shell. This supports a vacuum assisted RTM (VARTM)-process.

The number of internal channels may comprise a combination of at least one internal channel for communicating an injection fluid, such as the resin, to the outer surface of the shell, and at least one internal channel for communicating a vacuum pressure to the outer surface of the shell In an embodiment, the core structure comprises at least one inlet projecting outside the core shell, wherein the at least one inlet is arranged for connecting the internal chamber and/or the number of internal channels to a fluid pressure device or to a resin injection device. In particular, at least one inlet is integrally formed by the additive manufacturing process together with the core shell of the core structure. This enables a reliable manufacturing of the complex core structure.

In an embodiment, the outer surface of the core shell has corners, which have a corner radius smaller than 0.5, preferably smaller than 0.25, even more preferably smaller than 0.10, and wherein the layer thickness of the shell at the corners is substantially uniform. In particular, the corners may be located at a laminating surface area of the core shell for applying the reinforcement fibers and resin to the outer surface. In particular, corners at the core shell are integrally formed by the additive manufacturing process together with the core shell of the core structure. This enables a simple reliable manufacturing of the complex core structure, while obtaining an uniform layer thickness. A substantially uniform layer thickness is a layer thickness variation at the corners within ±50% deviation of an average thickness, preferably within ±25% deviation of the average thickness.

In an embodiment, the core shell comprises a local layer thickness, which varies depending on a laminate layer thickness of the reinforcement fibers and the resin, which are locally provided on the outer surface of the shell.

In an example, the local layer thickness of the core shell may be varied depending on a laminate layer thickness of the reinforcement fibers and the resin to control a thermal conductivity from inside the core shell to the laminate layer outside the core shell. In particular, in case a laminate layer is locally thicker a higher thermal conductivity of the shell is provided by selecting a relatively thinner core shell layer. In this way a curing speed of the reinforcement fibers and the resin can be made more uniform during the solidifying step.

In particular, the local layer thickness variation at the core shell is integrally formed by the additive manufacturing process together with the core shell of the core structure. This enables a simple reliable manufacturing of the complex core structure, while obtaining a varying layer thickness.

In an embodiment, providing the reinforcement fibers and the resin is carried out to provide a mixture of the reinforcement fibers and the resin on the outer surface of the shell of the core structure. The act of providing the reinforcement fibers on the outer surface of the shell of the core structure may be carried out before providing the resin on the outer surface of the shell of the core structure to provide, or to form, the mixture of the reinforcement fibers and the resin on the outer surface of the shell of the core structure. In an alternative embodiment, the reinforcement fibers and the resin may be provided on the outer surface of the shell of the core structure in the form of a mixture of the reinforcement fibers and the resin.

In any way, the solidifying of the resin may be carried out while the reinforcement fibers and the resin are present on the outer surface of the shell of the core structure as a mixture of the reinforcement fibers and the resin.

In an embodiment, providing said resin comprises injecting the resin at an injection pressure $P_I$ into the mould during. In this embodiment, a forming of a mixture of the reinforcement fibers and a resin on the outer surface of the shell of the core structure is carried out while the core structure including the reinforcement fibers are arranged inside the mould. The resin is injected into the mould in order to impregnate dry reinforcement fibers, which are arranged inside the mould in contact with the outer surface of the shell of the core structure.

The injection pressure $P_I$ may be in the range of 1 bar-10 bar, preferably in the range of 3 bar-8 bar.

In an embodiment, during solidifying the resin the fluid pressure $P_F$ inside the core structure is maintained substantially equal to the injection pressure $P_I$ of the resin and wherein the injecting of the resin at the injection pressure $P_I$ into the mould is at least partly carried out during solidifying the resin. In an example, the fluid pressure $P_F$ inside the core structure may be actively controlled by a fluid pressure device, which is arranged in fluid communication to the fluid in the internal chamber of the core structure. The fluid pressure device may control the fluid pressure $P_F$ inside the core structure to be substantially equal to the injection pressure $P_I$ of the resin.

In an embodiment, wherein maintaining the fluid pressure $P_F$ inside the core structure substantially equal to the injection pressure $P_I$ of the resin is carried out using a flexible membrane, wherein the flexible membrane is exposed to the fluid in the internal chamber at an inside and is exposed to the resin at an outside of the membrane. In this embodiment, the fluid pressure $P_F$ inside the core structure is passively controlled in response to the injection pressure $P_I$ of the resin; the moulding pressure $P_m$ of the resin inside the mould is controlled by the injection pressure $P_I$ of the resin. The flexible membrane, which makes a part of internal chamber flexible, communicates the moulding pressure $P_m$ of the resin to the fluid pressure $P_F$ inside the core. As a result, the fluid pressure $P_F$ inside the core adapts to the injection pressure $P_I$ of the resin.

In particular embodiments, the flexible membrane is an element which is attached to the shell of the core structure after forming the core structure.

In an embodiment, during solidifying the resin the fluid pressure $P_F$ inside the core structure is maintained lower than the injection pressure $P_I$ of the resin and wherein the injecting of the resin at the injection pressure $P_I$ into the mould is at least partly carried out during solidifying the resin. In an example, the fluid pressure $P_F$ inside the core structure may be actively controlled by a fluid pressure device, which is arranged in fluid communication to the fluid in the internal chamber of the core structure. The fluid pressure device may control the fluid pressure $P_F$ inside the core structure to be lower than the injection pressure $P_I$ of the resin. In this embodiment, the shell of the core structure has a sufficiently high bending stiffness such that a pressure differential remains between the fluid pressure $P_F$ inside the core structure and the injection pressure $P_I$ of the resin, which controls the moulding pressure of the resin in the mould.

In an embodiment, during solidifying the resin the internal chamber is maintained closed and the volume of the internal chamber is substantially constant. In this embodiment, the shell may be a fully closed shell. Additionally, the shell of the core structure has a sufficiently high bending stiffness such that a pressure differential remains between the fluid pressure $P_F$ inside the core structure and the injection pressure $P_I$ of the resin, which controls the moulding pressure of the resin in the mould.

In alternative embodiments, the shell may have an inlet, which is used for introducing the fluid into the internal chamber of the core structure. The inlet is held closed during solidifying the resin, such that the fluid cannot flow into or out of the chamber.

In an embodiment, during solidifying the resin the fluid pressure $P_F$ inside the core structure is maintained higher than the injection pressure $P_I$ of the resin and wherein the injecting of the resin at the injection pressure $P_I$ into the mould is at least partly carried out during solidifying the resin. In a typical example, the fluid pressure $P_F$ inside the core structure may be actively controlled by a fluid pressure device, which is arranged in fluid communication to the fluid in the internal chamber of the core structure.

In a particular embodiment, during solidifying the resin the moulding pressure $P_m$ of the resin inside the mould is controlled by the fluid pressure $P_F$ of the fluid in the core structure. Preferably, the shell of the core structure has a sufficient low bending stiffness such that the fluid pressure $P_F$ inside the core structure, which is higher than the injection pressure $P_I$ of the resin, controls the moulding pressure of the resin in the mould. When the shell of the core structure has a sufficient low bending stiffness, the shell expands in response to the fluid pressure $P_F$ of the fluid in the core structure, thereby increasing the moulding pressure of the resin in the mould.

In an embodiment, solidifying the resin comprises the heating the resin to a moulding temperature above ambient temperature. The moulding temperature may be in the range of 50-250° C., preferably in the range of 100-200° C. In a particular embodiment, solidifying the resin further comprises heating the fluid inside the internal chamber to heat the resin to the moulding temperature. Additionally, solidifying the resin may comprise maintaining the moulding temperature of the resin substantially constant by controlling the fluid temperature of the fluid inside the internal chamber.

In an embodiment, arranging the core structure and reinforcement fibers in the mould is carried out before providing said resin. In an exemplary embodiment, the reinforcement fibers may be placed on the outer surface of the shell before placing the core structure including the placed reinforcement fibers inside the mould. During the act of providing said resin the resin is introduced into the mould to impregnate the reinforcement fibers, which are located on the outer surface of the shell of the core structure inside the mould.

In another embodiment, providing said mixture is carried out before placing the core structure including said mixture, which is arranged on the outer surface of the shell of the core structure, inside the mould.

In a particular embodiment, providing said mixture comprises applying prepreg fibers on the outer surface of the shell of the core structure.

In an embodiment, the method further comprises removing the fluid from the core structure after solidifying the resin.

In an embodiment, solidifying the resin comprises integrating the core structure into the composite product. Preferably, when the resin is solidified and the composite product is formed, the composite product is formed with the shell of the core structure attached to the composite layers of the composite product. The shell and the composite layers typically adhere to each other, by which is meant that a force is needed to separate both parts. When the core structure of the composite product is integrated into the composite product, the shell may be completely or almost completely enclosed by the composite layers.

In another embodiment, the method further comprises removing the core structure from the composite product. After removing the core structure from the composite product, the composite product has a surface, which is a negative relief of the outer surface of the shell of the core structure. The core structure may optionally be used again as a mould part in preparing another composite product.

In an embodiment, the resin is a curable resin and wherein solidifying the resin comprises curing the curable resin.

In another embodiment, the resin is a thermoplastic resin and wherein solidifying the resin comprises raising the temperature to the moulding temperature for melting the thermoplastic resin and letting the composite product cool below the moulding temperature to solidify the thermoplastic resin.

According to another aspect of the invention there is provided a composite product obtainable from the method according to the invention, wherein the composite product includes the core structure.

According to another aspect of the invention there is provided a vehicle comprising a composite product according to the invention, wherein the vehicle is a vehicle selected from the group of boats, cycles, cars, trucks, busses, motorbikes, aerial vehicles and space vehicles.

According to another aspect of the invention there is provided a method for preparing a composite product, the method comprising:

forming a core structure having a plurality of layers, each layer being build by an additive manufacturing process; wherein the core structure has a shell substantially enclosing an internal chamber of the core structure, wherein the shell is fluid-impermeable, and wherein the outer surface has a predefined shape;

introducing a fluid into the chamber of the core structure;

arranging the core structure and reinforcement fibers in a mould, wherein the mould is arranged to accommodate the core structure including the reinforcement fibers, and wherein the reinforcement fibers and the outer surface of the shell are arranged in contact with each other;

providing the reinforcement fibers and a curable resin on the outer surface of the shell of the core structure;

curing the resin to form the composite product inside the mould at a moulding pressure $P_m$, while controlling the fluid pressure $P_F$ of the fluid in the core structure.

According to another aspect of the invention there is provided a method for preparing a composite product, the method comprising:

forming a core structure having a plurality of layers, each layer being build by an additive manufacturing process; wherein the core structure has a shell substantially enclosing an internal chamber of the core structure, wherein the shell is fluid-impermeable, and wherein the outer surface has a predefined shape;

introducing a fluid into the chamber of the core structure;

arranging the core structure and reinforcement fibers in a mould, wherein the mould is arranged to accommodate the core structure including the reinforcement fibers, and wherein the reinforcement fibers and the outer surface of the shell are arranged in contact with each other;

providing the reinforcement fibers and a thermoplastic resin on the outer surface of the shell of the core structure;

solidifying the thermoplastic resin to form the composite product inside the mould at a moulding pressure $P_m$, while controlling the fluid pressure $P_F$ of the fluid in the core structure;

wherein solidifying the thermoplastic resin comprises raising the temperature to the moulding temperature for melting the thermoplastic resin and letting the composite product cool below the moulding temperature to solidify the thermoplastic resin.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

By an additive manufacturing (AM) process is meant a process wherein 3D objects are manufactured by an additive process in which successive layers of material are laid down under computer control. These objects can be of almost any shape or geometry, and are produced from a 3D model or an electronic data source. Additive manufacturing processes are known in the art. In a method of the invention, an AM technique usually makes use of the extrusion of thermoplastic material, the sintering or melting of a granular material or the curing of a curable resin. An AM process is in particular selected from the group of fused deposition modeling (FDM), fused filament fabrication (FFF), selective heat sintering (SITS), selective laser sintering (SLS), selective laser melting (SLM), stereolithography (SLA), digital light processing (DLP), and continuous liquid interface production (CLIP).

The core structure according to the present invention is made using an additive manufacturing (AM) process. The core structure comprises a shell and an internal chamber. The shell substantially encloses the internal chamber of the core structure. The shell is made from a fluid-impermeable material. The advantage of the additive manufacturing (AM) process is that the shape of the shell may easily be formed such that it encloses an internal chamber of the core structure. The shell has an inner surface being exposed to the internal chamber and an outer surface being exposed outwards.

The shell may have an outer surface which substantially encloses the internal chamber in all directions of the internal chamber. In this embodiment, the shell defines the walls of the internal chamber in all directions of the internal chamber. For example, the shell may have a cubic shape or an egg shape. The shell may have a curvature and/or the shell may have a plurality of planar parts, which are connected at edges to one another.

In alternative embodiments, the shell may have an outer surface which encloses the inner chamber along a plane, while having one ore two open ends in a direction perpendicular to the plane. For example, a tube-like shell encloses the inner chamber along a circumference of the tube, while having two open ends in a direction perpendicular to the plane of the circumference. Such open ends may be closed by a closure element, such as a lid, before using the core structure for forming the composite product.

The core structure of the present invention preferably comprises an inlet for introducing the fluid into the internal chamber of the core structure. The additive manufacturing (AM) process has the advantage that a location and size of the inlet in the shell of the core structure may easily be controlled. Optionally, the core structure of the present invention may comprise an inlet for introducing the fluid into the internal chamber of the core structure and an outlet of the internal chamber. In case of a tube-like shell, the inlet and/or the outlet may be used to close an open end of the tube-like shell. In a particular example, the inlet and/or the outlet may be provided by a mould part, such as a metallic flange, which is a part of the mould to close the mould during the moulding process.

Additionally, an additive manufacturing (AM) process and an additive manufacturing material may easily be selected from the known additive manufacturing (AM) processes and the known additive manufacturing materials to provide a shell, which is not permeable for the fluid, which is used to fill the internal chamber of the core structure.

The shell may in principle be made of any material that is suitable for use in an AM process for the manufacture of a three-dimensional product. The shell is in particular made of, or comprises, a material selected from the group of thermoset materials, thermoplastic materials, ceramics, metals and alloys.

Another advantage of the additive manufacturing (AM) process is that the outer surface of the shell may be well defined. The outer surface of the shell is used according to the method of the present invention to accurately positioning any composite layers in the composite product. Additionally, the outer surface of the shell is used according to the method of the invention to accurately control a layer thickness of the composite layers in the composite product during the moulding process of the composite layers.

The outer surface of the shell, which is produced by the additive manufacturing (AM) process, has a predefined shape. Preferably, the shell is configured to retain said predefined shape of the outer surface of the shell constant during a placing of the reinforcement fibers on the outer surface of the shell, during a moulding process and/or during further use of the composite product formed by the moulding process.

In particular, the shell of the core structure is made of a material having a young's modulus E of at least 0.5 GPa, more preferably a young's modulus E of at least 1.0 GPa, most preferably a young's modulus E of at least 1.5 GPa. The material of the shell having a young modulus of at least 1.0 GPa provides that a shape of the shell including a predefined shape of the outer surface is sufficiently stable. The young's modulus provides the shell may be provided having a sufficient bending stiffness. As a result, the shell is configured to retain said predefined shape of the outer surface of the shell constant. In this way, the predefined shape of the outer surface is supports an accurate positioning of the composite layers in the composite product and supports an accurate defining of the thickness of the composite layers during a moulding process.

The young's modulus is determined according to test method described in ISO 527-1:2012 at a temperature of 20° C.

In embodiments the young's modulus is in a range of 0.25 GPa-500 GPa, more preferably in a range of 1.0 GPa-20 GPa. It is for example 0.5 GPa or more, 1.0 GPa or more, 1.5 GPa or more or 2.0 GPa or more. It is for example 25 GPa or less, 20 GPa or less, 15 GPa or less or 10 GPa or less.

The bending stiffness of the shell may be defined in various ways. The bending stiffness may be determined by at least one of a layer thickness of the shell, a material of the shell and any additional bridging elements arranged inside the internal chamber and connected to the shell. In a first example, a material of the shell is suitably selected by selecting the additive manufacturing (AM) process and an additive manufacturing material to prepare the core structure. In case a relatively stiff shell is required, an additive material providing a relatively stiff shell may be selected by having a relatively high young's modulus, such as a ceramic, a metal or a hard thermoset material. The young's modulus may be in the range of 2.0 GPa-25.0 GPa, preferably in the range of 3.0 GPa-10.0 GPa.

In case a relatively deformable shell is required, an additive material having a relatively low young's modulus may be selected, such as a thermoplastic material or a relatively flexible thermoset material. The young's modulus may be in the range of 0.5 GPa-3.0 GPa, preferably in the range of 0.5 GPa-2.0 GPa.

In a second example, a layer thickness of the shell, i.e. between its outer surface and its inner surface, is suitably selected to control the bending stiffness of the shell. Usually, the layer thickness (or the average thickness) is in the range of 0.1-5 mm, in particular in the range of 0.2-2.5 mm. It is for example 20 mm or less, 15 mm or less, 10 mm or less, 7 mm or less, 5 mm or less, 4 mm or less, 3 mm or less, 2 mm or less, 1 mm or less, 0.7 mm or less, 0.5 mm or less or 0.3 mm or less. It is for example 0.1 mm or more, 0.5 mm or more, 1 mm or more, 2 mm or more, 5 mm or more or 10 mm or more.

Preferably, a layer thickness of the shell is substantially uniform over the shell such that the bending stiffness of the shell is substantially uniform over the shell.

In a third example, additional bridging elements may be selected to be arranged inside the internal chamber to stiffen the shell. The bridging elements are arranged inside the internal chamber to connect a part of the shell at one end of the bridging element to another part of the shell at another end of the bridging element. Preferably, the bridging elements are shaped and arranged to increase a bending stiffness of the complete core structure.

In embodiments, the bridging elements are selected from bridging walls, bridging pillars and bridging weave elements.

The bridging elements may be are arranged inside the internal chamber extending in a longitudinal direction between an inner surface of the shell. The bridging elements have a thickness, i.e. perpendicular to the longitudinal direction. The thickness (or the average thickness) is in the range of 0.1-5 mm, in particular in the range of 0.2-2.5 mm. It is for example 20 mm or less, 15 mm or less, 10 mm or less, 7 mm or less, 5 mm or less, 4 mm or less, 3 mm or less, 2 mm or less, 1 mm or less, 0.7 mm or less, 0.5 mm or less or 0.3 mm or less. It is for example 0.1 mm or more, 0.5 mm or more, 1 mm or more, 2 mm or more, 5 mm or more or 10 mm or more.

In case the bridging elements are bridging walls, the inner chamber is divided into several sub-chambers by the bridging walls. The sub-chambers are arranged in fluid communication to each other by openings in the bridging walls.

The inner chamber may comprise a plurality of bridging walls, which divides the inner chamber into a corresponding plurality of sub-chambers. The bridging walls may have any suitable shape, such as a planar shape and a curved shape.

The fluid according to the invention is used to provide a fluid pressure inside the core structure. The fluid may be selected from any suitable fluid, including a polar fluid, such as water, and an apolar fluid. The fluid may also be a mixture of several liquid materials.

A composite product produced by a method of the invention has a composite layer made of a fiber-reinforced material. By a material that is fiber-reinforced is meant a material that is reinforced by reinforcement fibers selected from the group of short fibers (2-10 mm), long fibers (up to 50 mm) and continuous fibers.

The reinforcement fibers applied in a method of the invention have usually a length of at least 5 mm. They length may be 10 mm or more, 15 mm or more, 20 mm or more, 25 mm or more, 35 mm or more, 50 mm or more, 65 mm or more, 80 mm or more, 100 mm or more, 125 mm or more, 150 mm or more, 175 mm or more, 200 mm or more, 250 mm or more, 500 mm or more or 1,000 mm or more. The fibers may also be continuous fibers.

The aspect ratio (defined as the ratio of fiber length to fiber diameter) of fibers applied in a method of the invention is usually at least 10. It may be 20 or more, 50 or more, 100 or more, 200 or more, 500 or more or 1,000 or more.

The fibers that may be used in a method of the invention may in principle be any fiber that is suitable for a particular material. In the invention, the fiber may be selected from the group of glass fiber, carbon fiber (also known as graphite fiber), aramid fiber, polyethylene fiber (in particular ultra-high molecular weight polyethylene (UHMWPE) fiber), polypropylene fiber, nylon fiber, polyester fiber, boron fiber, natural fibers, hemp flax and combinations thereof.

The resin according to the invention may be typically selected from a curable resin and a thermoplastic resin. The resin is used to form the composite layer together with the reinforcement fibers.

The curable resin may in principle be any resin that can be shaped in a particular form, which form becomes permanent upon curing. The ability of a resin to be cured results from the presence of one or more curable chemical compounds in the resin. A curable chemical compound comprises one or more curable functionalities, which may be selected from the group of aliphatic epoxy, glycidyl ether, cycloaliphatic epoxy, hydroxyl, oxetane, vinyl ether, propenyl ether, crotyl ether, styrenic, acrylate, methacrylate, itaconate, maleimide, maleate, fumarate, cinnamate, acrylamide, methacrylamide, chalcone, thiol, allyl, alkenyl, and cycloalkenyl groups.

Usually, the curable resin is a light-curable resin, in particular a UV-curable resin, or a thermally curable resin. For example, a light-curable resin comprises an epoxy resin, a polyester resin, a vinylester resin, an acrylate resin, a polyurethane resin, a phenolic resin, a furane resin, a dicyclopentadiene (DCPD) resin or any mixture thereof. For example, a thermally curable resin is a resin selected from the group of epoxy resin, polyester resin, vinylester resin, acrylate resin, polyurethane resin, phenolic resin, furane resin, dicyclopentadiene (DCPD) resin or any mixture thereof. The curing of the resin in a method of the invention usually occurs under the influence of radiation and/or heat.

The thermoplastic resin may in principle be any resin that can be shaped in a particular form, when heated above a melting temperature or a softening temperature of the thermoplastic resin, and which solidifies when allowed to cool back to room temperature. The ability of the thermoplastic resin to solidify upon cooling of the thermoplastic resin is due to a crystallizing behavior and/or a glass forming behavior of the thermoplastic resin. The thermoplastic resin is, for example, selected from at least one of a polyester resin, a polyamide resin, an acrylic resin, a polycarbonate resin, a polylactic acid resin, a polyolefin resin, such as polyethylene and polypropylene, a polystyrene resin, a copolymer resin comprising two or more monomers, and combinations thereof.

The moulding process used in the method according to the invention for preparing a composite product may be any suitable pressure moulding process, such as a resin transfer moulding (RTM) process and a compression moulding process.

Preferably, when the resin is solidified and the composite product is formed, the composite product is formed with the shell of the core structure attached to the composite layers of the composite product. The shell and the composite layers typically adhere to each other, by which is meant that a force is needed to separate both parts. For example, the force is 0.1 MPa or more, 0.2 MPa or more, 0.5 MPa or more, 1 MPa or more, 2 MPa or more, 5 MPa or more, 10 MPa or more, 20 MPa or more, 50 MPa or more or 100 MPa or more, measured according to ASTM D4541.

Optionally, the core structure of the composite product is integrated into the composite product and completely or almost completely enclosed by the composite layers.

Figure 1:
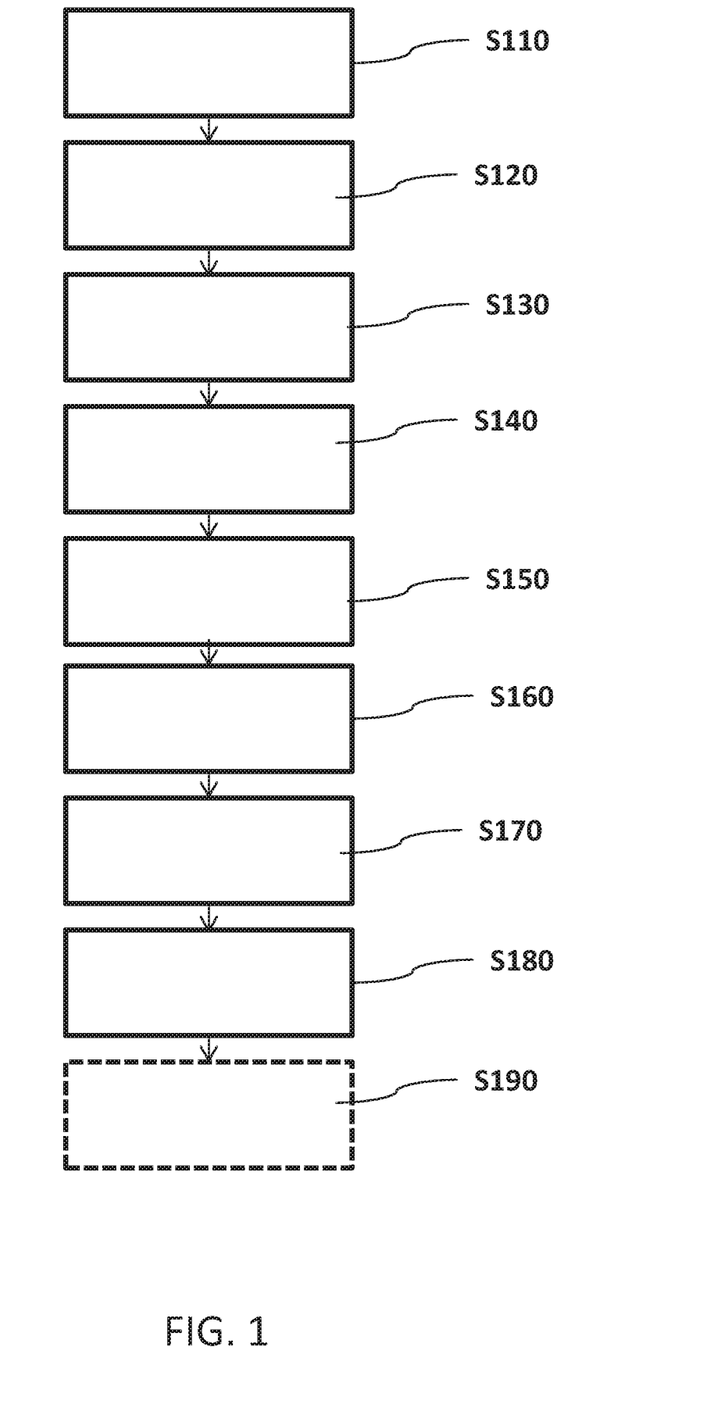
FIG. 1 illustrates schematically a flow diagram of a method of the invention.

FIG. 1 illustrates schematically a flow diagram of a method of the invention.

The method shown in the flow diagram of FIG. 1 has a first step S110 of calculating a geometry of a core structure. The calculated geometry of the core structure has a shell which has an outer surface, which is predefined to allow the positioning of reinforcement fibers in the composite product. Additionally, the calculated geometry of the core structure has an internal chamber, which is substantially enclosed by the shell. Depending on the application, the core structure can be defined or calculated to withstand structural loads in service (using different types of infill such as lattice, minimal surface, etc) and/or can be defined or calculated to enable the moulding process (such as RTM process). Optionally, an inlet and/or an outlet of the internal chamber of the core structure can be defined or calculated for connecting the internal chamber of the core structure with an external pressure source.

In a second step S120 the core structure is formed according to the geometry calculated in step S110 using an additive manufacturing process. The additive manufacturing process may be selected from any suitable additive manufacturing process.

In the additive manufacturing process, typically, the geometry of the core structure is formed by a plurality of layers, wherein each layer is build by the additive manufacturing process. The resulting core structure has a shell and an internal chamber, wherein the shell substantially encloses the internal chamber of the core structure.

Figure 2:
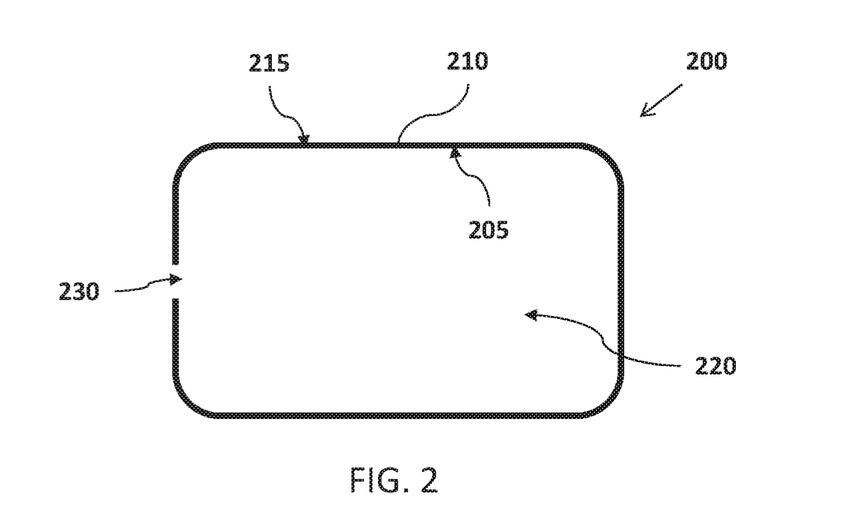
FIG. 2 illustrates schematically a cross section of a core structure of an exemplary embodiment of the invention.

An example of a core structure 200 calculated in step S110 and made in step S120 using an additive manufacturing process is shown in FIG. 2. FIG. 2 shows a cross section of the core structure 200, showing a shell 210 which substantially encloses an internal chamber 220 of the core structure 200. The shell has an inner surface 205, which is exposed to the internal chamber 220. The core structure 200 has an inlet 230 for introducing a fluid into the internal chamber 220. The shell 210 is fluid-impermeable and has an outer surface 215, which has a predefined shape, which is defined in step S110. The core structure 200 including the shell 210 is configured such that the core structure 200 retains said predefined shape of the outer surface of the shell 215 under ambient pressure. In particular, the shell 210 is configured to have a bending stiffness, which is sufficient to maintain its predefined shape of the outer surface of the shell 215 while placing dry reinforcement fibers on the outer surface of the shell 215.

In this way, the outer surface of the shell can be used for accurately positioning the composite layer of reinforcement fibers and a resin in the composite product.

Figure 3:
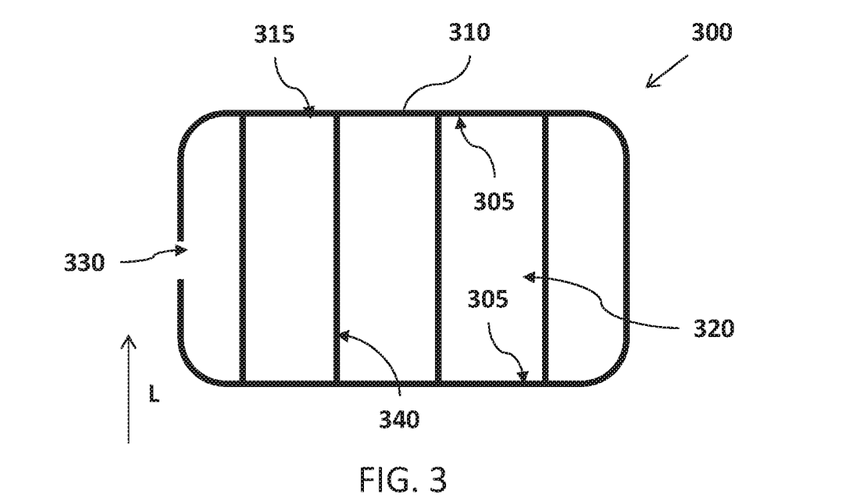
FIG. 3 illustrates schematically a cross section of a core structure of another exemplary embodiment of the invention.

In alternative embodiments of the core structure, which is defined in step S110 and formed in step S120, the core structure additionally comprises bridging elements arranged for bridging the internal chamber. An example of said core structure is shown in FIG. 3, which shows a cross section of core structure 300. The core structure 300 comprises a shell 310, which comprises an inner surface 305, an outer surface 315, an internal chamber 320, an inlet 330 and additionally comprises bridging elements 340 arranged inside the internal chamber 320 for bridging the internal chamber 320. The bridging elements 340 extend between the inner surface 305 of the shell 310 in a first direction L and are configured to stiffen the shell 310 in said direction L. In this way, the bridging elements 340 further enhance a bending stiffness of the shell 310 in order to maintain the predefined shape of the outer surface of the shell 315. In this example shown, the bridging elements 340 are pillars extending in the first direction L.

Optionally, the bridging elements 340 may be wall elements extending in the first direction L and extending in a second direction along a viewing direction of the FIG. 3 (i.e. perpendicular to the cross section plane of the FIG. 3). The wall elements stiffen the shell 310 both in the first direction L and in the second direction.

Although not shown in the cross section of FIG. 3, the various parts of the internal chamber 320 between adjacent bridging elements 340 are arranged in fluid communication to one another such that a fluid pressure inside the chamber 320 is uniform. The bridging elements may be suitably selected from walls, pillars and weave elements.

In a next step S130 the reinforcement fibers are placed on the outer surface of the shell of the core structure. In exemplary embodiments, the reinforcement fibers may be placed on a part of the outer surface of the shell. In alternative embodiments, the reinforcement fibers may be distributed over the outer surface of the shell for substantially completely surrounding the outer surface of the shell. Optionally a resin may be used for temporarily fixing the reinforcement fibers on the outer surface of the shell.

In a next step S140 the core structure including the placed reinforcement fibers are placed inside a mould, which can be used for moulding the composite product. The mould may comprise two mould parts. In examples, the mould may comprise two metal mould parts, the mould may comprise a metal mould part and a polyester mould part, the mould may comprise a metal mould part and a flexible film part and the mould may comprise two polyester mould parts.

Optionally, step S140 may additionally comprise the step of placing reinforcement fibers inside the mould on a mould part before placing the core structure inside the mould. The additional reinforcement fibers may be placed inside the mould to contact the outer surface of the shell after placing the core structure inside the mould.

In a next step S150 the internal chamber of the core structure is filled with a fluid, such as water. In order to fill the internal chamber with the fluid, tubes may be attached to an inlet and/or an outlet of the internal chamber of the core structure, and said at least one tube is arranged in fluid connection to a fluid pressure device. Said fluid pressure device may include a fluid reservoir. In step S150 the fluid inside the internal chamber may be pre-pressurised by the fluid pressure device. In this embodiment, step S150 is carried out after step S140. Alternatively, step S150 may be carried out before step S140. Optionally, step S150 may be carried out before step S130 and step S140.

In a step S160 a mixture of the reinforcement fibers and a resin is formed on the outer surface of the shell of the core structure. The resin may be a curable resin.

Step S160 is carried out after step S140 of placing the core structure including dry reinforcement fibers inside the mould. In alternative exemplary embodiments, step S160 may be carried out before step S140 of placing the core structure inside the mould.

Typically, in a Resin Transfer Moulding (RTM) process step S160 is carried out after step S140 of placing the core structure including dry reinforcement fibers inside the mould.

In embodiments of step S160, the resin is injected into the closed mould at an injection pressure $P_I$. In particular the resin is injected into the mould to impregnate the reinforcement fibers, which are positioned on the outer surface of the shell of the core structure. By impregnating the reinforcement fibers, a suitable mixture of the reinforcement fibers and the resin is provided on the outer surface of the shell of the core structure.

The injection pressure $P_I$ may be provided by a resin pressure device, which includes a resin reservoir. The resin pressure device may control the injection pressure $P_I$ of the resin by applying an overpressure to the resin reservoir. Alternatively, the resin pressure device may control the injection pressure $P_I$ of the resin by applying an underpressure to the resin reservoir to draw the resin into the mould. Such a process may be a vacuum assisted RTM (VARTM)-process.

In a step S170 the resin is solidified in the mixture to form the composite product inside the mould at a moulding pressure $P_m$, while controlling the fluid pressure $P_F$ of the fluid in the core structure. In this embodiment the step S160 is part of a Resin Transfer Moulding (RTM) process, wherein the step of injecting the resin into the closed mould at an injection pressure $P_I$ at least partially overlaps the step of S170 solidifying the resin in the mixture to form the composite product inside the mould at a moulding pressure $P_m$. The injection pressure $P_I$ used during the act of solidifying the resin in step S170 may be optionally selected higher than the injection pressure $P_I$ used before solidifying the resin in step S170.

In embodiments of step S170, the fluid inside the internal chamber is pressurised by the fluid pressure device in order to maintain the fluid pressure $P_F$ in the internal chamber substantially equal to the injection pressure $P_I$ of the resin. In this way a differential pressure between the resin, which is present outside the outer surface of the shell, and the fluid inside the shell is minimised. This minimises any stresses on the shell and/or deformations of the shell during the moulding step.

In a particular embodiment, the step S160 of injecting the resin into the closed mould at an injection pressure $P_I$ may comprise an impregnating step, which is carried out before step S170 and a forming step, which is carried out during step S170. In the impregnating step at least a part of the dry reinforcement fibers is impregnated by the resin. During the impregnating step, a fluid pressure $P_F$ of the fluid in the internal chamber may be held temporarily lower than the injection pressure $P_I$ of the resin in order to enhance an impregnation of the reinforcement fibers.

Step S170 may additionally comprise a step of heating the fluid inside the core structure to a curing temperature of the curable resin. The raised temperature of the fluid inside the core structure heats the curable resin, which is present adjacent to the outer surface of the shell, to the curing temperature. As a result, the curable resin cures and solidifies, while being present as a mixture of the reinforcement fibers and the resin on the outer surface of the shell, thereby forming the composite layer of the composite product.

After step S170 the injection pressure $P_I$ of the resin and the fluid pressure $P_F$ are lowered to nominal pressure.

In a next step S180 the composite product is taken out of the mould. The step S180 may comprise the steps of removing the fluid from the core structure and removing any tubes, which are present, from the core structure. Alternatively, the fluid, which is present inside the core structure, may remain inside the core structure during further use of the composite product.

Optionally, in a next step S190 the resulting composite product may be finished by removing any excess solidified resin and/or removing any inlet and/or outlet of the core structure.

Figure 5:
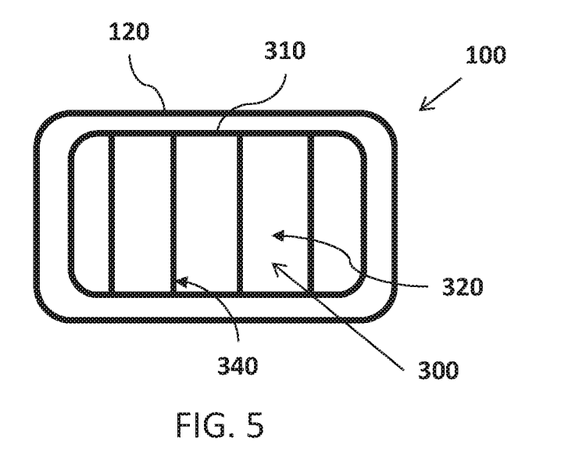
FIG. 5 illustrates schematically a cross section of composite product produced by an exemplary method of the invention.

After steps S110-S190, the resulting composite product 100 may include the core structure, which is integrated into the composite product. FIG. 5 shows a cross section of composite product 100, wherein the core structure 300 is integrated. The integrated core structure 300 is fixed to the composite layers 120 of the composite product 100. Optionally, the core structure of the composite product 100 comprises bridging elements arranged for bridging the internal chamber, such as is shown in FIG. 5. Preferably, the bridging elements, which are present inside the core structure, are arranged for retaining the shape of the composite product substantially constant during regular use of the composite product.

For example, use of the composite product as a part of a vehicle in automotive application or as part of an airplane in aeroplane application demands a considerable strength or stiffness of the composite product at a lower weight of the composite product.

The composite product 100, which comprises the core structure 300 including a hollow internal chamber 320 and bridging elements 340 provides the advantage of a relatively stiff composite product having a lower weight.

Figure 6:
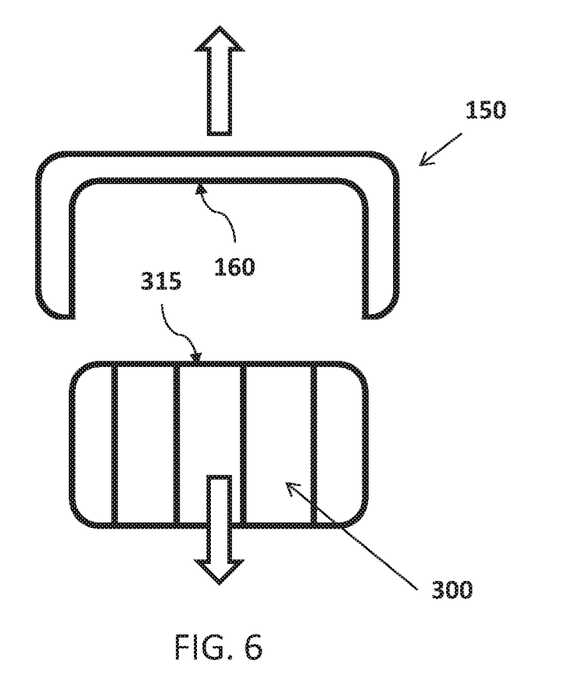
FIG. 6 illustrates schematically a cross section of composite product produced by an exemplary method of the invention.

Alternatively, step S190 may comprise the step of removing the core structure from the resulting composite product 150, as is shown in FIG. 6. FIG. 6 shows a cross section of composite product 150. The resulting composite product 150 has an inner surface 160, which is a negative relief of a part of the outer surface 315 of the core structure 200, 300. The core structure 200, 300 may optionally be used again as a mould part in preparing another composite product 150.

In an alternative embodiment of step S170, step S170 comprises maintaining the fluid pressure $P_F$ inside the core structure substantially equal to the moulding pressure $P_m$ of the resin inside the mould using a flexible membrane. The flexible membrane is attached to the core structure, wherein the flexible membrane is exposed to the fluid in the internal chamber at an inside and is exposed to the resin at an outside of the membrane. The flexible membrane is arranged to close an opening in the shell to the internal chamber. The flexible membrane is impermeable to the fluid and is impermeable to the resin used. Said flexible membrane functions as an equalizing member to communicate the moulding pressure $P_m$ of the resin inside the mould, which is determined by the injection pressure $P_I$ of the resin, to the fluid inside the core. The advantage is that the fluid pressure $P_F$ inside the core structure is passively held substantially equal to the moulding pressure $P_m$ of the resin, and to the injection pressure $P_I$ of the resin, without the need to use an external fluid pressure device and any tube for communicating a fluid pressure to the internal chamber of the core structure.

The flexible membrane is attached to the core structure before step S150 of filling the internal chamber of the core structure with the fluid.

In yet an alternative embodiment of step S170, step S170 comprises maintaining the fluid pressure $P_F$ inside the core structure lower than the injection pressure $P_I$ of the resin. In said embodiment, in step S150 the internal chamber of the core structure is filled with a fluid after which the internal chamber is maintained closed. In particular any fluid inlet openings, in case present, are closed. During step S160 and step S170 the volume of the internal chamber is substantially constant. The shell of the core structure has a sufficiently high bending stiffness such that a deformation of the shell is restricted and a pressure differential remains between the fluid pressure $P_F$ inside the core structure and the injection pressure $P_I$ of the resin. As a result the injection pressure $P_I$ of the resin controls the moulding pressure of the resin in the mould.

Figure 4:
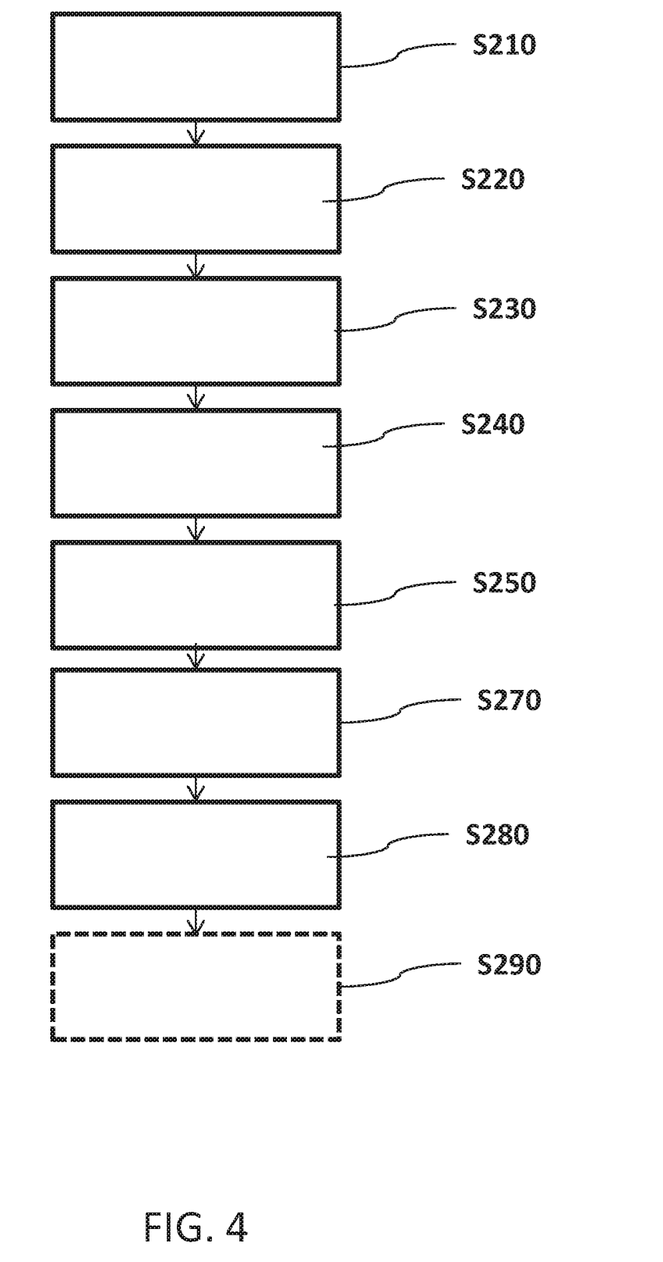
FIG. 4 illustrates schematically a flow diagram of another embodiment of the method of the invention.

FIG. 4 illustrates schematically a flow diagram of another embodiment of the method of the invention. The method shown comprises a compression moulding process for forming the composite product.

The method comprises the steps of S210 calculating a geometry of a core structure and S220 forming a core structure using an additive manufacturing process, wherein the core structure is formed according to the geometry determined in step S210. The steps S210 and S220 may be carried out in similar way as the steps S110 and S120, respectively, of the method shown in FIG. 1.

In a next step S230 a mixture of the reinforcement fibers and a resin is provided on the outer surface of the shell of the core structure. The resin may be a curable resin. In an alternative embodiment, the resin may be a thermoplastic resin.

In an example, the step of providing the mixture comprises applying prepreg fibers on the outer surface of the shell of the core structure. The prepreg fibers are a mixture of reinforcement fibers and the resin, which are mixed before applying prepreg fibers on the outer surface of the shell of the core structure. In an alternative example, the step of providing the mixture comprises a step of placing dry reinforcement fibers on the outer surface of the shell of the core structure and a step of applying a resin on the outer surface of the shell of the core structure. The resin may be applied in a liquid form and may be applied in a solid form, such as in the form of a powder.

In a next step S240, the core structure including the mixture of the reinforcement fibers and the resin are placed inside a compression mould, which can be used for moulding the composite product. Typically, the compression mould has at least two hard mould parts, which act together to apply an external pressure during the moulding process.

In a next step S250, the internal chamber of the core structure is filled with a fluid, such as water. In order to fill the internal chamber with the fluid, tubes may be attached to an inlet and/or an outlet of the internal chamber of the core structure, and said at least one tube is arranged in fluid connection to a fluid pressure device. Said fluid pressure device may include a fluid reservoir. In step S250 the fluid inside the internal chamber may be pre-pressurised by the fluid pressure device. In this embodiment, step S250 is carried out after step S240. Alternatively, step S250 may be carried out before step S240. Optionally, step S250 may be carried out before step S230 and step S240.

In a next step S270, the composite product is formed inside a compression mould. During step S270 the resin is solidified in the mixture to form the composite product inside the mould at the moulding pressure $P_m$, while controlling the fluid pressure $P_F$ of the fluid in the core structure. In this embodiment, the moulding pressure $P_m$ is controlled by an external pressure source, such as a hydraulic moulding press, which acts on at least one moulding part of the mould.

In case the resin is a curable resin, during step S270, the curable resin is solidified by curing the resin. In case the resin is a thermoplastic resin and step S270 comprises raising the temperature to a moulding temperature for melting the thermoplastic resin and further comprises letting the composite product cool below the moulding temperature to solidify the thermoplastic resin.

In a next step S280 the composite product is taken out of the mould. The step S280 may comprise the steps of removing the fluid from the core structure and removing any tubes, which are present, from the core structure. Alternatively, the fluid, which is present inside the core structure, may remain inside the core structure during further use of the composite product.

Optionally, in a next step S290 the resulting composite product may be finished by removing any excess solidified resin and/or removing any inlet and/or outlet of the core structure.

After steps S210-S290, the resulting composite product include the core structure, which is integrated into the composite product, similar to the composite product shown in FIG. 5.

Alternatively, step S290 may comprise the step of removing the core structure from the resulting composite product, such as is shown in FIG. 6. The core structure may optionally be used again as a mould part in preparing another composite product.

Figure 7A:
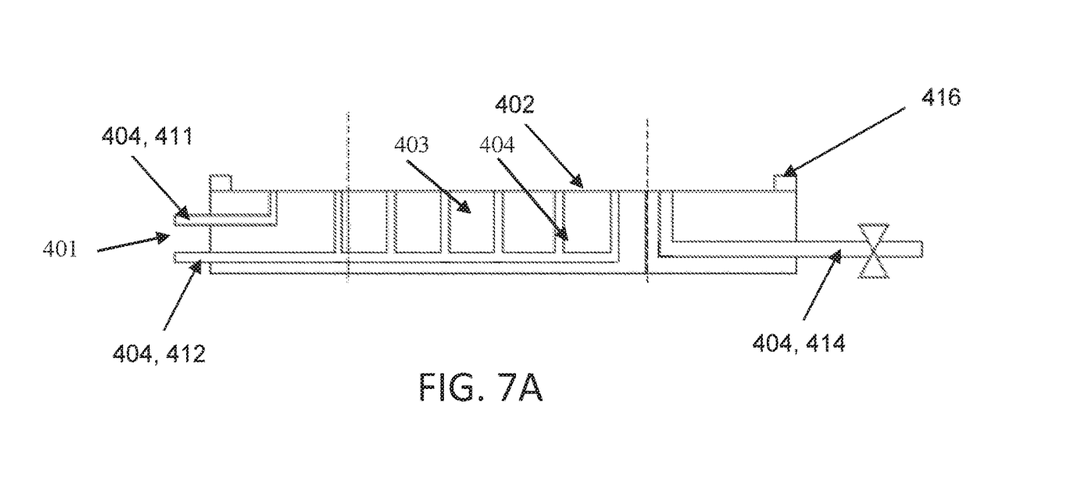
FIG. 7A illustrates schematically a cross section of a core structure of another exemplary embodiment of the invention.
Figure 7B:
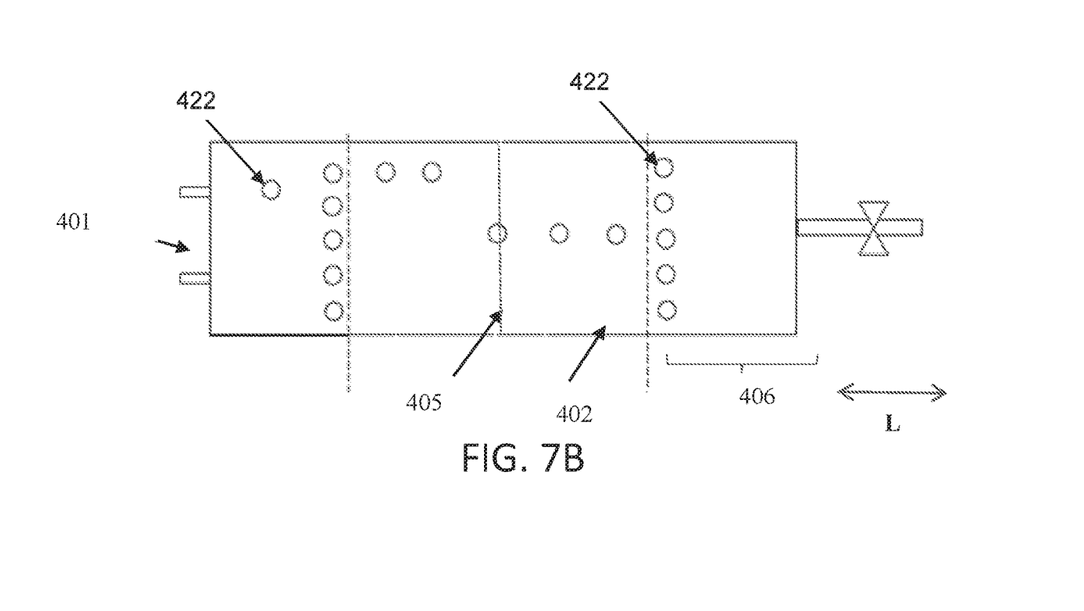
FIG. 7B illustrates schematically a top view of a core structure of another exemplary embodiment of the invention of FIG. 7A.

FIG. 7A illustrates schematically a cross section of a core structure of another exemplary embodiment of the invention. FIG. 7B illustrates schematically a top view of a core structure of another exemplary embodiment of the invention of FIG. 7A.

The 3D printed core structure 401 comprises a shell, at least one laminating surface 402 for applying the reinforcement fibers and resin, and an internal chamber within the shell and further includes at least one of: bridging elements (e.g. lattice structure) 403, internal channels, such as tubes 404, for communicating an infusion resin or communicating a gas pressure, such as a vacuum pressure, to the laminating surface 402 and surface channels 405 to allow the flow of the infusion resin along the laminating surface 402.

Tube system 404 can be placed in such a way that infusion process can occur in a convergent (L-RTM) direction or divergent (RTM) direction. Convergent direction as meant herein means in a lateral direction L along the laminating surface 402 from outside ends of the printed core 401 towards a centre position along the lateral direction. Divergent direction as meant herein means in a lateral direction L along the laminating surface 402 from a centre position along the lateral direction towards outside ends of the printed core 401 along the lateral direction.

The tubes may additionally comprise an inlet section, which projects from an outside end of the printed core 401 along the lateral direction. The inlet section may be used to easily connect the tubes or channels inside the printed core 401 to supplying equipment of infusion resin and/or a pressure device, such as a vacuum pressure device.

Figure 7C:
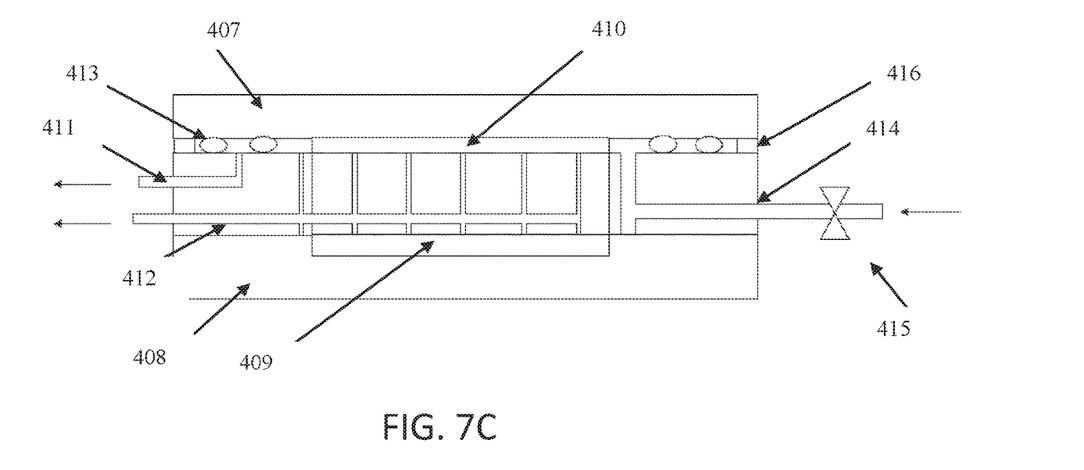
FIG. 7C illustrates schematically a moulding system for the core structure of FIGS. 7A and 7B.

FIG. 7C illustrates schematically a moulding system for the core structure of FIGS. 7A and 7B. For closed moulding system, the manufacturing of composite parts starts with placing the lower composite reinforcement fibers web 409 on the lower moulding part 408. Then, the 3D printed infusion core structure 401 is placed on top, the upper composite reinforcement fibers web 410 is added and the mould is closed with the top moulding part 407. The vacuum pressure is applied by tube 411 and tube 412. The tubes 411 and 412 are examples of tubes 404 shown in FIGS. 7A and 7B and each have an opening 422 at the outer surface of the core shell. Tube 411 may be a vacuum tube for clamping effect. Tube 412 may be a vacuum tube for removing air in the composite laminate layers. Sealants 413 may be placed to separate the clamping vacuum from the vacuum pressure for removing air in the composite laminate layers. Tubes 412, 414 can be placed in such a way that infusion process can occur in a convergent (L-RTM) or divergent (RTM) manner. Resin is then injected under pressure or vacuum assisted using tube 414. Valve 415 can be also 3D printed on tubes to control the vacuum and infusion sequence. A spacer 416 can be 3D-printed on the core as well, in order to control reinforcement fibers web 409, 410 thicknesses. The spacer 416 can be located at the surface of a spare region of 3D printed infusion core structure 401. Preferably the spacer 416 is located at the surface of a spare region of 3D printed infusion core 401 at both sides of the 3D printed infusion core 401 along the lateral direction L.

In particular examples, the 3D printed infusion core 401 may have corners located at the outer laminating surface 402 for applying the reinforcement fibers and resin, which have a corner radius, which is smaller than 0.5, preferably smaller than 0.25, even more smaller than 0.10. In an example, the surface channels at the outer surface 402 may have corners having a corner radius, which is smaller than 0.5.

The use of 3D printing for complex geometries has the advantage of improving control of the layer thickness even at the corners of the surface 402. As such, a better uniformity of the layer thickness of the core at the corners may be obtained. For example, the layer thickness variation at the corners may be within ±50% deviation of the average thickness, preferably within ±25% deviation of the average thickness.

The use of 3D printing for complex geometries has the advantage of improving control of the layer thickness, with direct impact over the use of excess material. Part weight and temperature gradient distribution are the main two beneficial properties of using a uniform layer thickness.

In a specific embodiment, the shell layer thickness may be varied based on a selection of applied (functional) differences in layer thickness in the core shell.

Having the option to apply differences in layer thickness can provide benefits in terms of strength, stiffness and/or temperature gradient distribution during the curing of composite parts with variable laminate thickness.

A proper curing process implies a constant temperature of the composite product. If heat is applied from inside-out (by heating the liquid inside the core), and the wall thickness is constant, we can expect to find different temperatures in the laminate, depending on its thickness.

Presuming that the resin solidification is done by heating the fluid inside the internal chamber, a passive solution to control temperature gradient is to increase locally the thickness of the core shell. Knowing the thermal conductivity value of the shell material, the curing speed in different sections of the composite part can be controlled.

By using a variable thickness of the core wall, the temperature difference on the laminate surface will be minimal, improving the curing process. For example, when dealing with thick laminates (e.g 2 to 50 mm), a thin layer of printed wall is desired, so the heat is transferred instantly. For areas of the product having small composite thickness (e.g 0.5 to 2 mm) a thick printed wall can be used so the heat will be applied gradually. Main advantage on this type of core is that it will suppress the need to control the temperature on the tooling surface depending on the laminate thickness, reducing the complexity and the price for mould tooling equipment.

In particular, the thickness of the core shell may be controlled to vary at least 25%, preferably at least 50%, more preferably at least 100% along the surface of the core shell, relative to the smallest thickness of the core shell along the surface of the core shell.

It should be appreciated by those skilled in the art that any block diagrams herein represent conceptual views of illustrative units or modules embodying the principles of the invention.

Whilst the principles of the invention have been set out above in connection with specific embodiments, it is to be understood that this description is merely made by way of example and not as a limitation of the scope of protection which is determined by the appended claims.

The invention claimed is:

1. A method for preparing a composite product, the method comprising:
    forming a core structure having a plurality of layers, each layer being built by an additive manufacturing process; wherein the core structure has a shell substantially enclosing an internal chamber of the core structure, wherein the shell is fluid-impermeable, and wherein the outer surface of the shell has a predefined shape, and wherein the core structure comprises a plurality of bridging elements arranged for bridging the internal chamber, wherein the bridging elements are arranged inside the internal chamber to connect a part of the shell at one end of the bridging element to another part of the shell at another end of the bridging element;
    introducing a fluid into the chamber of the core structure;
    arranging the core structure and reinforcement fibers in a mould, wherein the mould is arranged to accommodate the core structure including the reinforcement fibers, and wherein the reinforcement fibers and the outer surface of the shell are arranged in contact with each other;
    providing the reinforcement fibers and a resin on the outer surface of the shell of the core structure; and
    solidifying the resin to form the composite product inside the mould at a moulding pressure $P_m$, while controlling the fluid pressure $P_F$ of the fluid in the core structure, wherein the core structure comprises a number of internal channels arranged within the core shell for communicating an injection fluid or a vacuum pressure to the outer surface of the shell, and wherein the core structure comprises at least one inlet projecting outside the core shell, wherein the at least one inlet is arranged for connecting the internal chamber and/or the number of internal channels to a fluid pressure device or to a resin injection device.

2. The method according to claim 1, wherein the shell of the core structure is made of a material having a young's modulus E of at least 0.5 GPa.

3. The method according to claim 1, wherein the bridging elements are configured to stiffen the shell in at least one direction.

4. The method according to claim 1, wherein the bridging elements are selected from walls, pillars and weave elements.

5. The method according to claim 1, wherein the outer surface of the core shell has corners, which have a corner radius smaller than 0.5, and wherein the layer thickness of the shell at the corners is substantially uniform.

6. The method according to claim 1, wherein the core shell comprises a local layer thickness, which varies depending on a laminate layer thickness of the reinforcement fibers and the resin, which are locally provided on the outer surface of the shell.

7. The method according to claim 1, wherein providing the reinforcement fibers and the resin is carried out to provide a mixture of the reinforcement fibers and the resin on the outer surface of the shell of the core structure.

8. The method according to claim 1, wherein providing the resin comprises the step of injecting the resin at an injection pressure $P_I$ into the mould.

9. The method according to claim 8, wherein during solidifying the resin the fluid pressure $P_F$ inside the core structure is maintained substantially equal to the injection pressure $P_I$ of the resin and wherein said injecting of the resin at the injection pressure $P_I$ into the mould is at least partly carried out during solidifying the resin.

10. The method according to claim 9, wherein during solidifying the resin the step of maintaining the fluid pressure $P_F$ inside the core structure substantially equal to the injection pressure $P_I$ of the resin is carried out using a flexible membrane, wherein the flexible membrane is exposed to the fluid in the internal chamber at an inside and is exposed to the resin at an outside of the membrane.

11. The method according to claim 8, wherein during solidifying the resin the fluid pressure $P_F$ inside the core structure is maintained lower than the injection pressure $P_I$ of the resin and wherein said injecting of the resin at the injection pressure $P_I$ into the mould is at least partly carried out during solidifying the resin.

12. The method according to claim 8, wherein during solidifying the resin the fluid pressure $P_F$ inside the core structure is maintained higher than the injection pressure $P_I$ of the resin and wherein said injecting of the resin at the injection pressure $P_I$ into the mould is at least partly carried out during solidifying the resin.

13. The method according to claim 1, wherein during solidifying the resin the controlling of the fluid pressure $P_F$ is performed using an external fluid pressure device and wherein the fluid pressure device is arranged in fluid connection to the chamber.

14. The method according to claim 1, wherein solidifying the resin comprises the step of heating the resin to a moulding temperature above ambient temperature.

15. The method according to claim 1, wherein the method further comprises removing the fluid from the core structure after solidifying the resin.

16. The method according to claim 1, wherein solidifying the resin comprises integrating the core structure into the composite product.

17. The method according to claim 1, wherein the resin is a curable resin and wherein solidifying the resin comprises curing the curable resin.

18. The method according to claim 1, wherein the resin is a thermoplastic resin and wherein solidifying the resin comprises raising the temperature to the moulding temperature for melting the thermoplastic resin and letting the composite product cool below the moulding temperature to solidify the thermoplastic resin.

19. The method according to claim 1, wherein the internal channels are tubes.

20. The method according to claim 1, wherein the injection fluid is the resin.

21. A composite product obtainable from the method according to claim 1, wherein the composite product includes the core structure.

\* \* \* \* \*